United States Patent
Mathur et al.

(10) Patent No.: US 7,124,397 B1
(45) Date of Patent: Oct. 17, 2006

(54) POWER BUILDER FOR POWER MANAGEMENT CONTROL SYSTEM AUTOMATION SOFTWARE

(75) Inventors: Sunil Mathur, Guilderland, NY (US); James M. Koepsell, Rexford, NY (US); Donna M. Izzo, Mechanicville, NY (US); Eric L. Sands, Altamont, NY (US); Geoffrey F. Butland, Farmington, CT (US)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 213 days.

(21) Appl. No.: 09/681,584

(22) Filed: May 2, 2001

Related U.S. Application Data (60) Provisional application No. 60/203,095, filed on May 5, 2000.

(51) Int. Cl.
*G06F 9/44* (2006.01)
(52) U.S. Cl. .................. 717/101; 717/169; 717/175
(58) Field of Classification Search ........ 717/100–113, 717/120–122, 168–170, 175; 345/734–743
See application file for complete search history.

(56) References Cited

U.S. PATENT DOCUMENTS

| | | | |
|---|---|---|---|
| 4,185,460 A | 1/1980 | Moore et al. | |
| 5,504,907 A | 4/1996 | Stewart et al. | |
| 5,519,261 A | 5/1996 | Stewart | |
| 5,768,148 A | 6/1998 | Murphy et al. | |
| 5,862,391 A | 1/1999 | Salas et al. | |
| 5,967,756 A | 10/1999 | Devier et al. | |
| 6,065,124 A | 5/2000 | Lee | |
| 6,219,046 B1 | 4/2001 | Thomas et al. | |

OTHER PUBLICATIONS

Zubeck, "Implementing Reuse with RAD Tools' Native Objects", IEEE, pp. 60-65, Oct. 1997.*
SyBase, "Generating Components with PowerBuilder", www.sybase.com, pp. 1-4, Mar. 1999.*

* cited by examiner

*Primary Examiner*—Ted T. Vo
(74) *Attorney, Agent, or Firm*—Mark A. Conklin; Armstrong Teasdale LLP (57) ABSTRACT

A Power Builder for a power management control system facilitates automated addition and configuration of devices to a system project. By invoking the Power Builder as an option to the system, device selection becomes automated and points associated with the selected devices are automatically created. Main menu screens are generated which contain pre-configured wizards and screens for the selected devices. A configuration update is performed on the system and the project is restarted.

38 Claims, 8 Drawing Sheets

POWER BUILDER FOR POWER MANAGEMENT CONTROL SYSTEM AUTOMATION SOFTWARE

CROSS REFERENCE TO RELATED APPLICATIONS

This invention relates generally to This application claims the benefit of U.S. Provisional Application No. 60/203,095, filed May 5, 2000, which is hereby incorporated by reference in its entirety.

BACKGROUND OF INVENTION

This invention relates generally to computer systems and in particular, to a power management control system in which a plurality of power monitoring and control devices are coupled to and controlled by a computer through a common bus.

In known power management control systems, a control computer communicates, via a network server, with intelligent end devices (IEDs), such as relays, meters, and other analysis tools and power control devices via an ethernet or other network to which the computer is connected. The network gateway facilitates communications between the computer and the network. User interfaces are used to configure and monitor the performance of IEDs. Adding and configuring IEDs and associated screens into a system from the user interface however, is a complex and tedious process typically having a steep learning curve. Further, source code usually needs to be added to a system when adding IEDs to a power management control system.

SUMMARY OF INVENTION

In one aspect, a method for adding devices to a power management control system is provided which includes the steps of prompting a user to create a new project, prompting the user to add devices to the new project, configuring the added devices, and generating screens for the devices added to the project.

In another aspect a power control management system is provided which includes a control computer, at least one intelligent end device interfaced to the control computer for controlling and monitoring power, and a software package to control the system. The software package includes a user interface, an applications layer, an operating system and a Power Builder for facilitating automated addition and configuration of user selected intelligent end devices to the power management control system. The Power Builder is configured to build external applications onto a power management control project framework, automatically create points associated with selected devices and generate main menu screens for the selected devices.

In a further aspect, a computer is provided which is programmed to prompt a user to create a project, prompt a user to select devices to be added to the project, configure the selected devices, and generate screens for the selected devices.

In still another aspect, a method for facilitating automated addition and configuration of user selected devices to a power management control system is provided. The method includes the steps of building an external application onto a project framework, automatically configuring components associated with selected devices and generating main menu screens for the selected devices.

DETAILED DESCRIPTION

Figure 1:
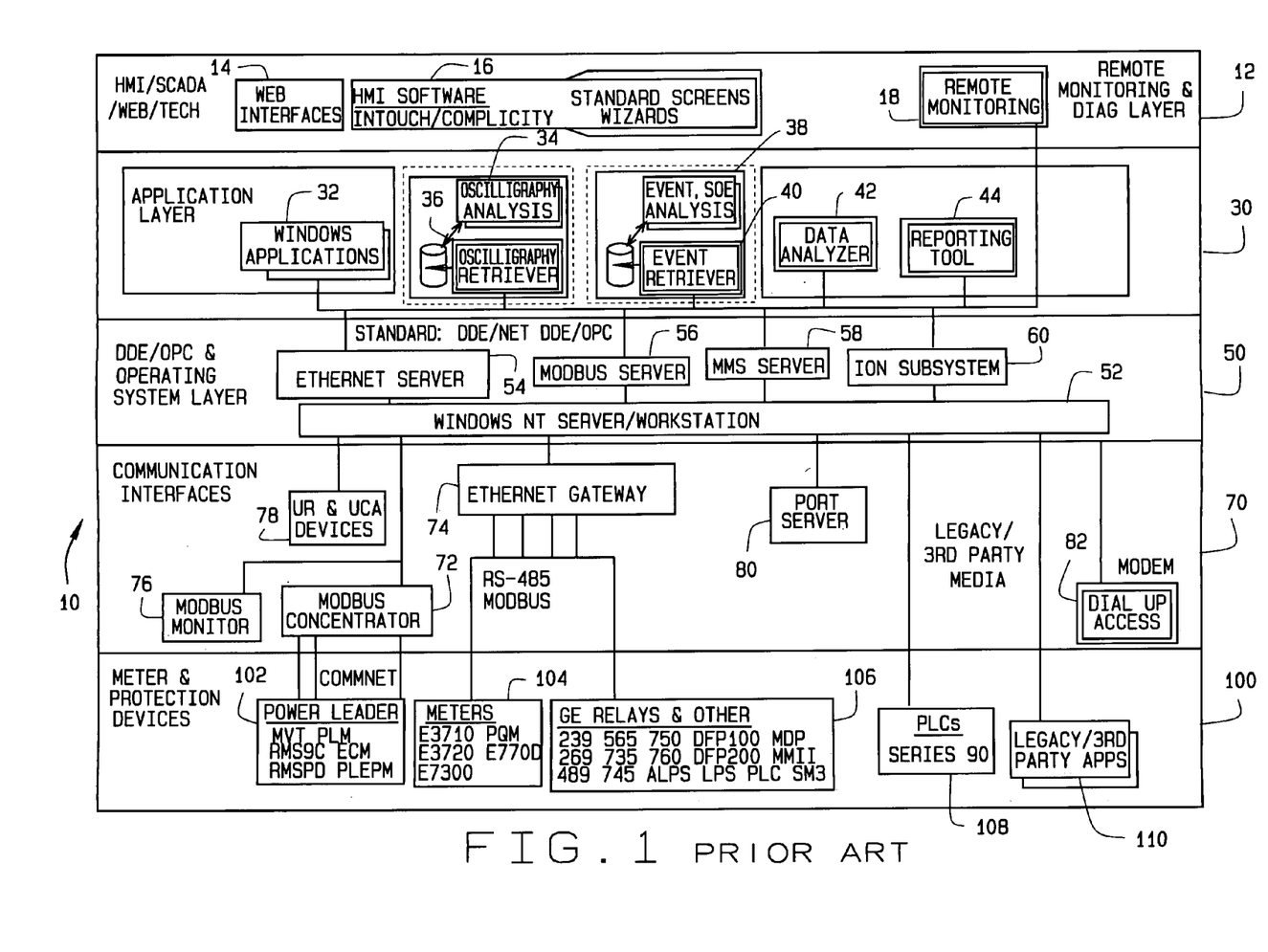
FIG. 1 is a diagram of a known power management control system.

FIG. 1 is a diagram of a known power management control system 10 divided into functional layers. A human interface layer 12 includes operating software that causes information to be entered, formatted and presented to a user of the system, for example on a monitor. In the embodiment shown in FIG. 1, layer 12 includes a web interface 14, a user interface 16 for the power management control system including standard screens and wizards, and a remote monitoring package 18.

An application layer 30 includes software packages where data sent and retrieved from hardware including power management control system 10 is analyzed. Included in application layer 30 are windows applications 32, an oscillography analysis module 34 and retriever module 36, a sequence of events analysis module 38 and retriever module 40, a data analyzer module 42, and a reporting tool 44. Oscillography analysis module 34 and retriever module 36 are typically where functions such as voltage waveform measurement and comparisons to known quantities take place. Sequence of event analysis module 38 and retriever module 40 are typically where functions such as measurement and reporting of timing events take place, for example, frequency or as another example when a switch was turned off or on.

A dynamic data exchange/object linking and embedding for process control (DDE/OPC) and operating system layer 50 includes control computer hardware 52 and associated servers. In a power management host computer there are a number of protocol specific servers including an ethernet server 54, a Modbus® server 56, a manufacturers message specification (MMS) server 58 and an ION® protocol subsystem 60. Modbus is a registered trademark of Gould Inc, located at 10 Gould Center, Rolling Meadows Ill. 60008, and ION is a registered trademark of Power Management LTD., located at 6703 Rajpur Place Victoria, British Columbia Canada. Dynamic data exchange and/or object linking and embedding (OLE) for process control allows external programs to access data in a windows environment through communications interface layer 70. For example, Modbus server 56 facilitates direct communication with a Modbus concentrator 72. Further, ethernet server 54 provides for ethernet communication with an ethernet gateway 74. Server 54 and gateway 74 are, in known systems, a proprietary product, custom designed for communication with a known set of intelligent end devices (IEDs) (not shown). Typically, ethernet server 54 and gateway 74 are supplied as one product of a manufacturer, and communications between the devices are sometimes accomplished using non-industry standard communications protocols.

The servers listed above service a plurality of communication interfaces as shown in communication interface layer 70. Included in layer 70 are several gateways including Modbus concentrator 72, ethernet gateway 74, a Modbus monitor 76 and a utility communication architecture and universal relay devices 78, a port server 80 supporting other communications protocols and a dial up modem 82.

A meter and protection devices layer 100 includes a variety of devices available for communication with and control of within power management control system 10. A variety of communications protocols are also included. Using Modbus concentrator 72, devices 102 which communicate using a Commnet protocol can communicate on a Modbus network. Meters 104 and relay devices 106 communicate using ethernet gateway 74. Programmable logic controllers 108 and other legacy/third party applications 110 communicate directly with computer 52 through a serial port attached to the computer or directly via the ethernet.

Figure 2:
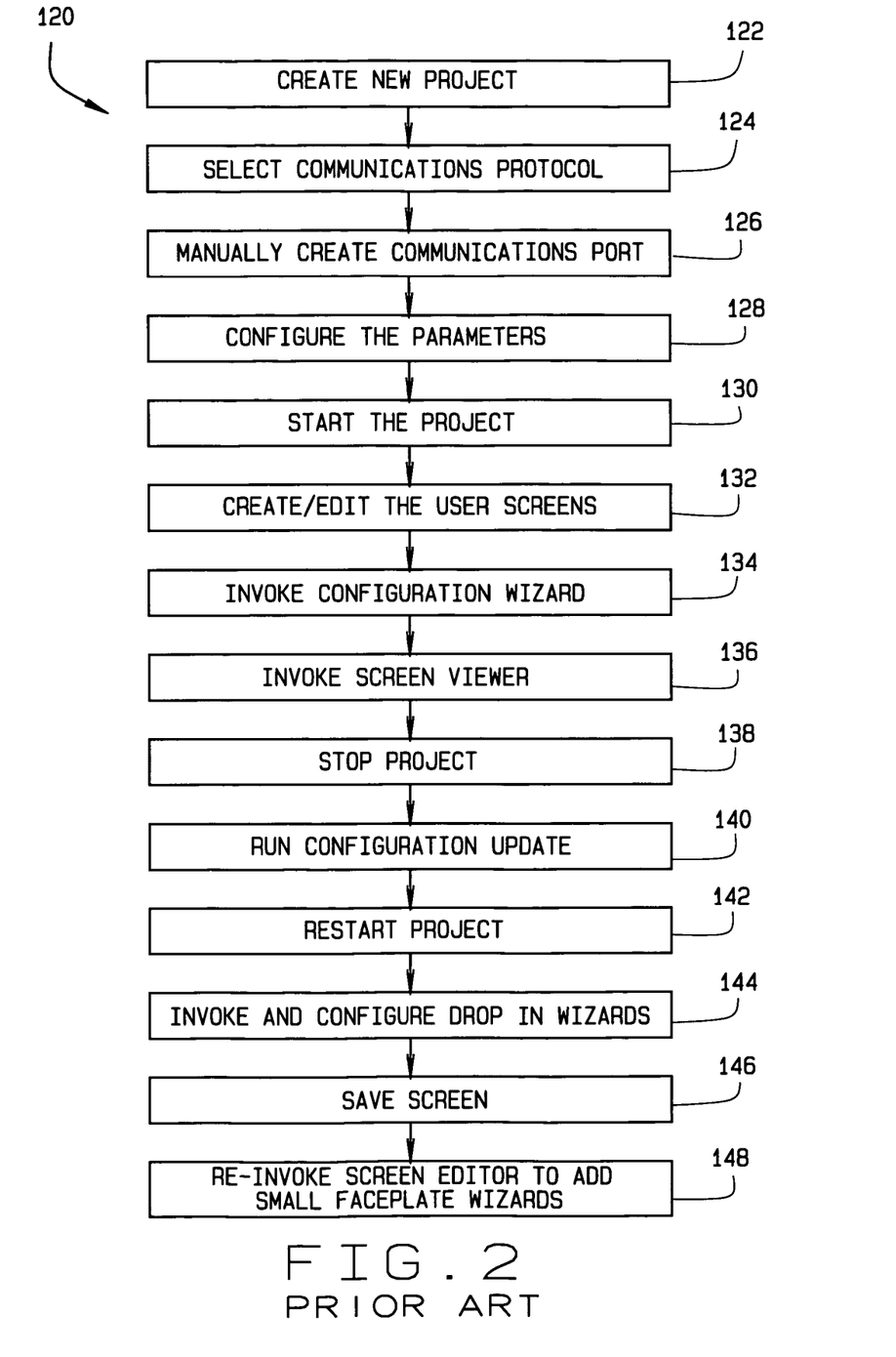
FIG. 2 is a flowchart illustrating a known configuration process.

The above described system 10 is typically programmed using a user interface, typically operating under a Windows® operating system. Windows is a registered trademark of the Microsoft Corporation, Redmond, Wash. Known methods for configuring a power management control system are tedious, step driven processes. One known process is diagrammed in FIG. 2 as a flowchart 120. Referring specifically to flowchart 120, a user creates 122 a new project and selects 124 a communications protocol such as one of the protocols discussed above. The user manually creates 126 the communications port, configures 128 the parameters, starts 130 the project and creates/edits 132 the user screens. Then, the user invokes 134 a configuration wizard where the wizard must be placed in the screen and then the screen is saved. A screen viewer is invoked 136 to open the screen saved in the previous step and configure the system ports and devices using the wizard. The project is then stopped 138, and a configuration update is run 140 from the workbench. The project is then restarted 142. Drop in wizards are invoked 144 and configured using a screen editor for each device added previously, which involves exploring layers of wizards available. The screen must again be saved 146 and the screen editor re-invoked 148 to add small faceplate wizards for the devices added previously and the screens linked to the devices. The project is then ready for run-time viewing.

Figure 3:
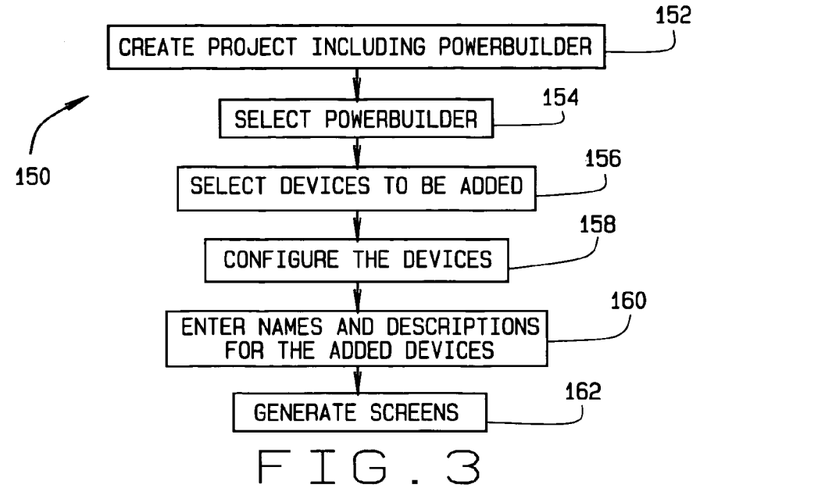
FIG. 3 is a flowchart illustrating a configuration process using a PMCS Power Builder.

FIG. 3 is a flowchart 150 illustrating a device configuration process using a PMCS Power Builder. The process illustrated in flowchart 150 is further described in the descriptions for user interfaces for Power Builder in FIGS. 5–12 below. First, a user creates 152 a project which includes a Power Builder option. The user then selects 154 Power Builder from a user interface. By invoking the Power Builder, the user is able to add devices 156 to the project for configuration 158. After configuring 158 the devices, the user causes the system to generate 160 screens for the devices added to the project. Finally, the user enters 162 names and descriptions for the devices added to the project.

Figure 4:
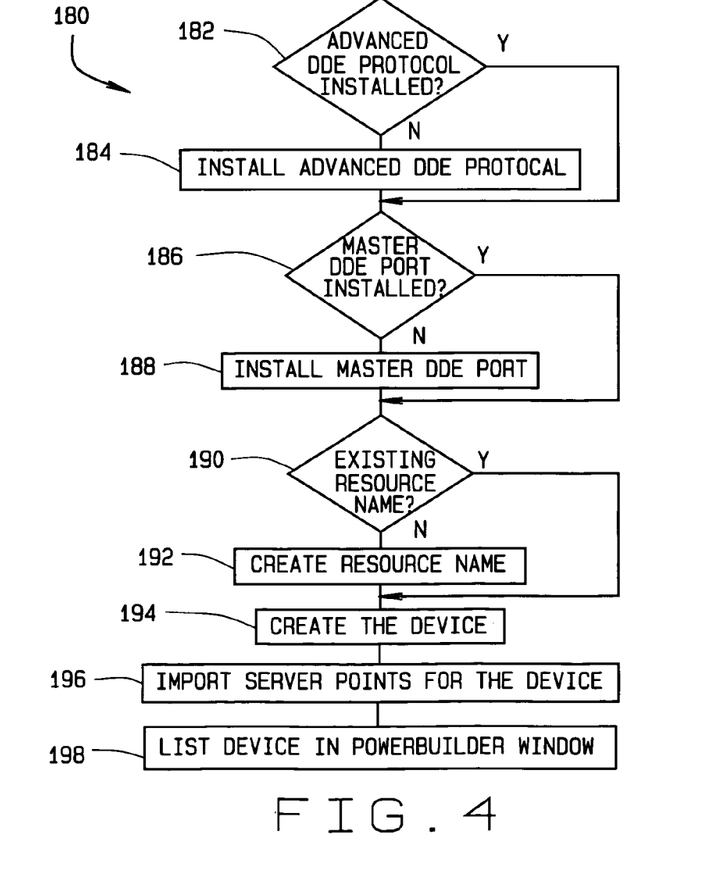
FIG. 4 is a flowchart illustrating a Power Builder system process.

FIG. 4 is a flowchart 180 diagramming functions that system 10 executes based upon system inputs from a user as described in FIG. 3. When adding a device with Power Builder option selected, system 10 determines 182 whether an advanced DDE protocol is installed within the project, if not, system 10 installs 184 the Advanced DDE protocol. Next, system 10 determines 186 whether a master DDE port has been created within the project, if not, system 10 creates 188 the master DDE port. System 10 further determines 190 if a resource name exists, if no resource name exists, system 10 creates 192 a resource name. System 10 then creates 194 the DDE devices and imports 196 server points for the device, and lists 198 the device in the PMCS Power Builder window.

Figure 5:
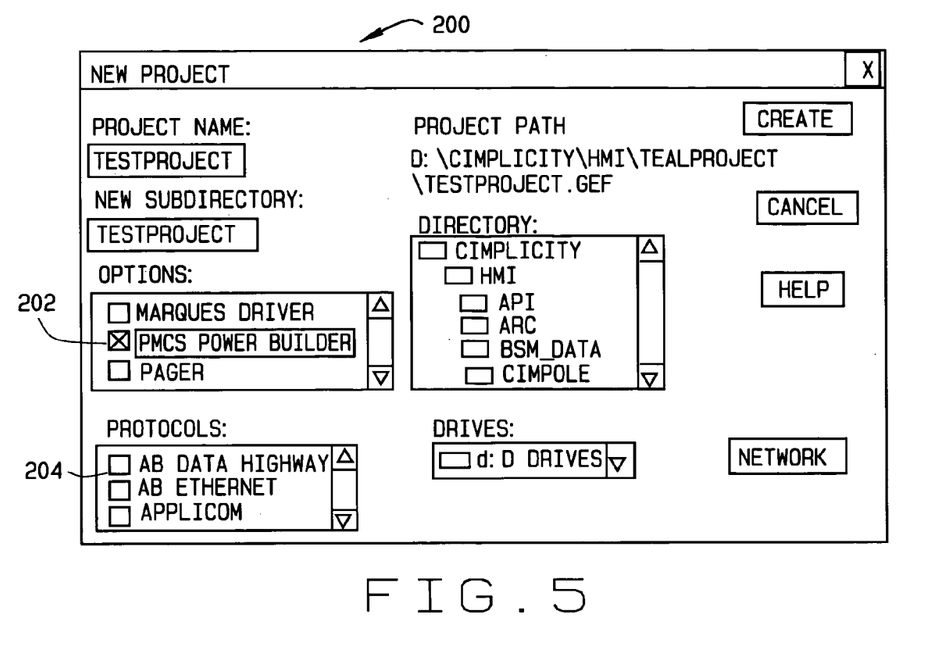
FIG. 5 is a user interface showing availability of a Power Builder option on a server when a user begins a new project.

FIG. 5 is a exemplary user interface 200 for a system that simplifies the processes and steps described above for creating and building a new project. Interface 200 includes an option menu 202 which includes an option to select PMCS Power Builder. PMCS Power Builder is an external application built into a project framework to automate configuration tasks by automatically configuring critical project components, including graphics screens. PMCS Power Builder provides tighter integration between the power management control system and the project application software resulting in more robust, expandable applications and a level of perceived ease of use not previously available. Addition of devices is easier since the Power Builder is a data driven engine that accepts device input from an easily editable text file. Historically, software development was required to add new devices to a power management control system product. When selecting a Power Builder option, an advanced dynamic data exchange (DDE) protocol is selected from protocol menu 204.

Figure 6:
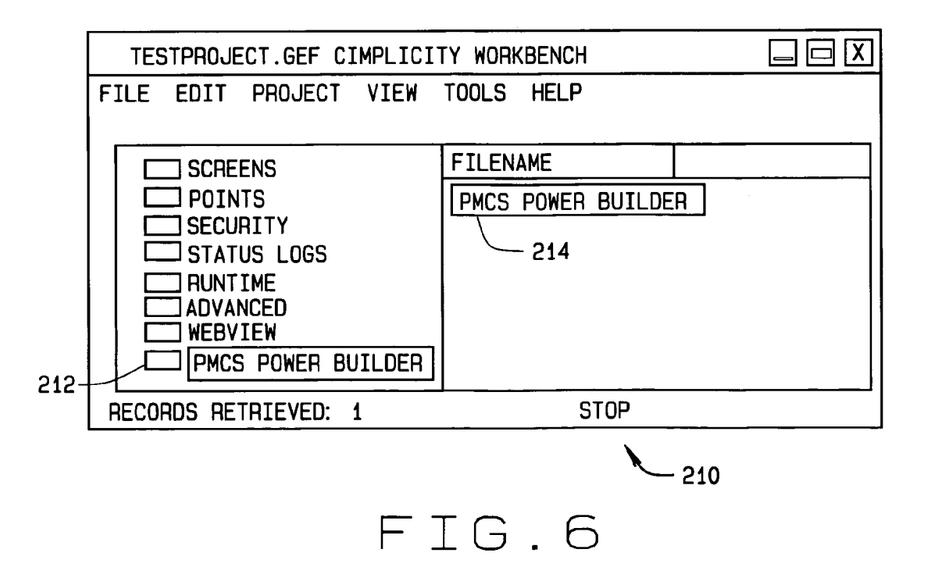
FIG. 6 is a user interface showing a Power Builder icon added to a project workbench.

FIG. 6 shows a project workbench user interface 210. By selecting Power Builder option 202 (shown in FIG. 5), a Power Builder icon 212 is added to a project workbench user interface 210. Upon selection of icon 212, file selections available for execution are displayed. PMCS Power Builder 214 is such a file selection.

Figure 7:
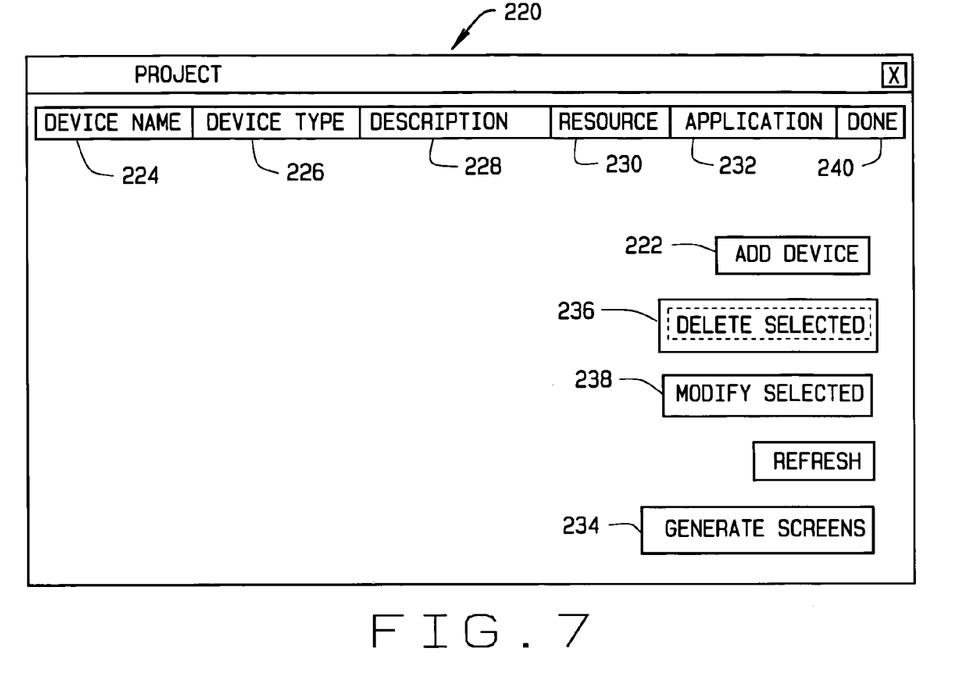
FIG. 7 is a user interface for developing an application using the Power Builder.

FIG. 7 shows an interface 220 for building an application. The user adds devices required for the application desired by selecting an add device tab 222. Interface 220 further includes links for a user to enter a device name 224, a device type 226, a description 228, a resource 230 and an application name 232 for the selected device. The user then invokes screen generation for the selected devices by selecting a generate screens tab 234. Devices can be deleted by selecting a delete tab 236 or modified by selecting a modify tab 238. When entry of devices is completed, the user selects a done tab 240. By selecting generate screens tab 234, the Power Builder automatically creates the points associated with the selected devices. In addition, a main menu screen is generated which contains pre-configured small faceplate template wizards for the selected devices. Template wizard screens for the selected devices are also generated. A configuration update is performed and the project is restarted.

Figure 8:
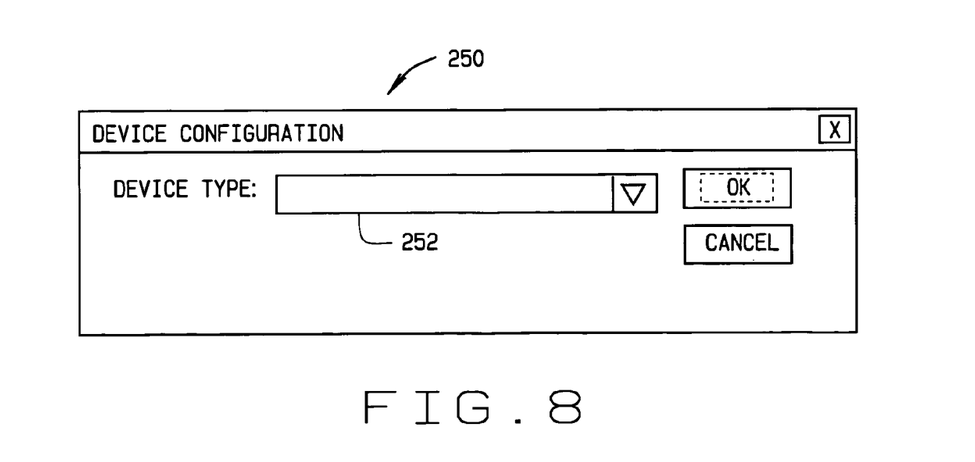
FIG. 8 is a device configuration user interface.
Figure 9:
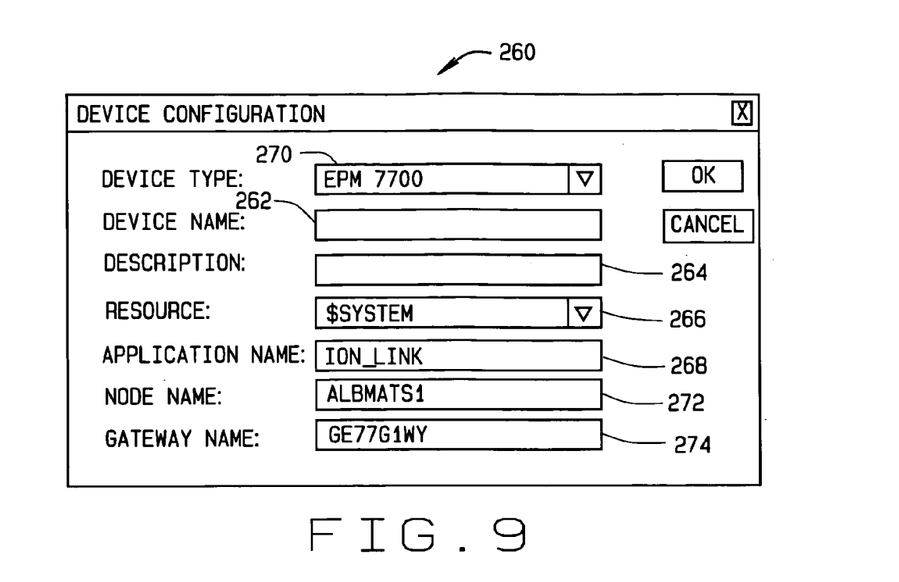
FIG. 9 is a device configuration user interface for a selected device type.

FIG. 8 is an exemplary device configuration user interface 250 displayed to a user who has selected device type 226 (shown in FIG. 7). As shown in FIG. 8, the user is presented with a device type pull-down menu 252 for the entry of a device type being added to the PMCS system. Upon selection of a device type, a device configuration user interface 260 is displayed to the user, as shown in FIG. 9. After selection of a device type as described above, the device type is configured. For device configuration, data entry fields are presented for a device name 262, a description 264, a resource 266 and an application name 268. Device type field 270 as selected previously is also displayed. A node name 272 and a gateway name 274 for the device being added are also displayed. Resources 266 can be manually entered or selected from a pull down menu. It is to be noted that the fields described in FIG. 9 are equivalent to data entry fields 224, 226, 228, 230 and 232 available for selection as described in FIG. 7.

After entry of device data as described above PMCS Power Builder determines whether advanced DDE protocol is installed in the project, and if not, PMCS Power Builder installs an advanced DDE protocol. PMCS Power Builder then determines whether a master DDE port is created in the project, and if not, PMCS Power Builder creates the port. Further, PMCS Power Builder determines whether the resource name exists, and if not, PMCS Power Builder creates a resource name. Also PMCS Power Builder creates a DDE device by the device name input which has a DDE topic that is the same as the input device name. In addition, PMCS Power Builder imports a set of points from a configuration file associated with the device and the device is listed in a PMCS Power Builder user interface.

Figure 10:
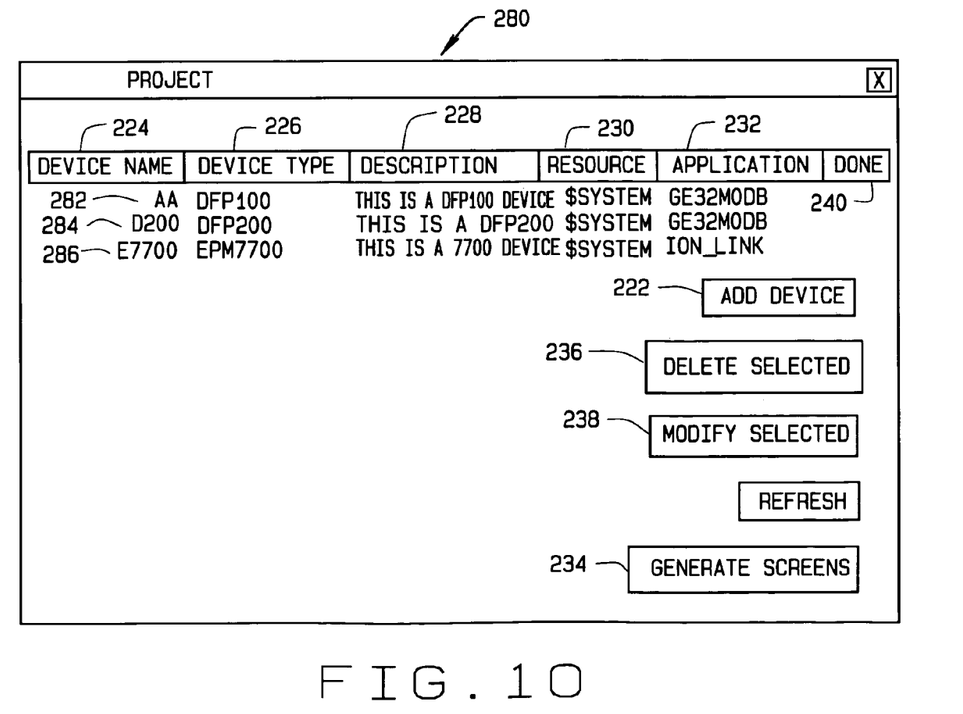
FIG. 10 is a PMCS Power Builder user interface for three selected devices.

FIG. 10 is an exemplary PMCS Power Builder user interface 280 showing that three devices, AA 282, D200 284 and E7700 286 are being added to the PMCS system using PMCS Power Builder. Components of user interface 280 which are identical to components of user interface 220 (shown in FIG. 7), are identified in FIG. 10 using the same reference numerals used in FIG. 7.

Figure 11:
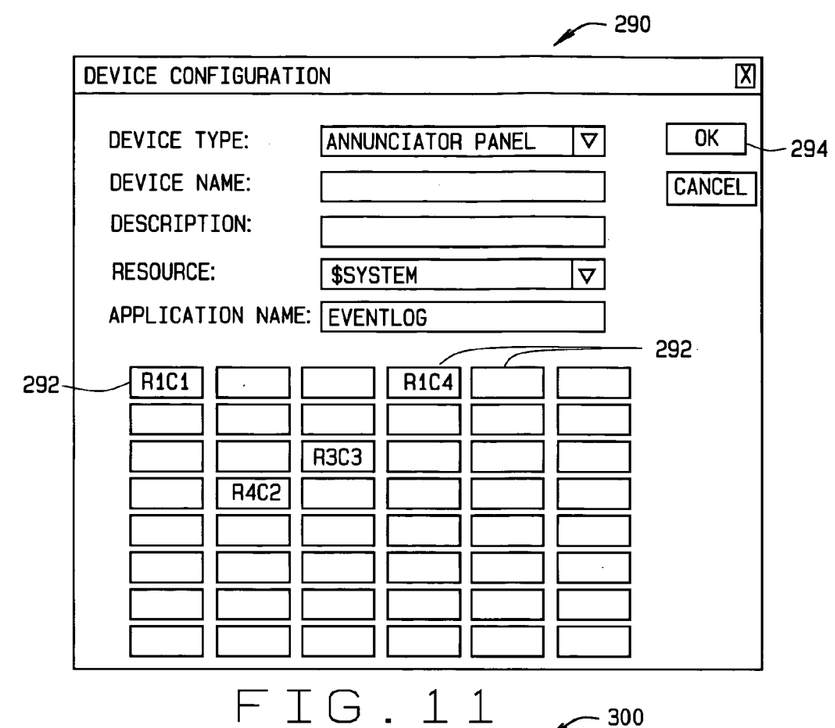
FIG. 11 is a device configuration user interface for configuring an annunciator panel device.

FIG. 11 illustrates a device configuration user interface 290 for configuring an annunciator panel device. User interface 290 is displayed when an annunciator device is selected, for example, by using device type pull down menu 292 (shown in FIG. 8). The user then enters an annunciator panel name and provides a description for the panel. An existing resource is then selected from the pulldown menu, or alternatively, a new resource name is entered in the edit box. Then the DDE application name is changed to point to an event server. Annunciator panel buttons 292 are configured by inputting text which is displayed on annunciator panel buttons 292 and in the wizard (described below). All of the configured panel buttons will be displayed. Selection of an OK button 294 completes configuration of the annunciator panel.

Figure 12:
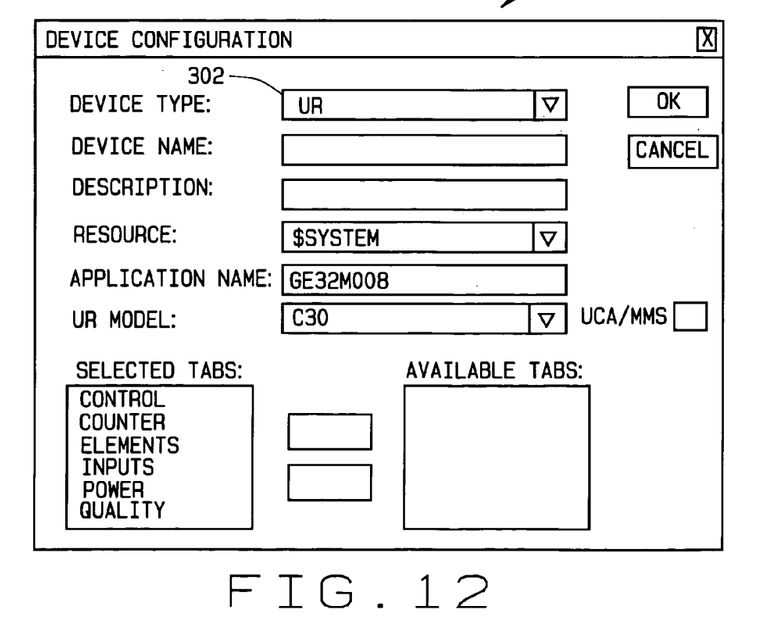
FIG. 12 is a device configuration user interface for configuring a universal relay device.

FIG. 12 illustrates a device configuration user interface 300 for configuring a universal relay device. To configure such a device a user selects UR (universal relay) from device type pull down menu 302. Configuring a universal relay is similar to configuring an annunciator panel as described above in FIG. 11. FIG. 12 is included to illustrate different user interfaces for configuration of different devices.

Figure 13:
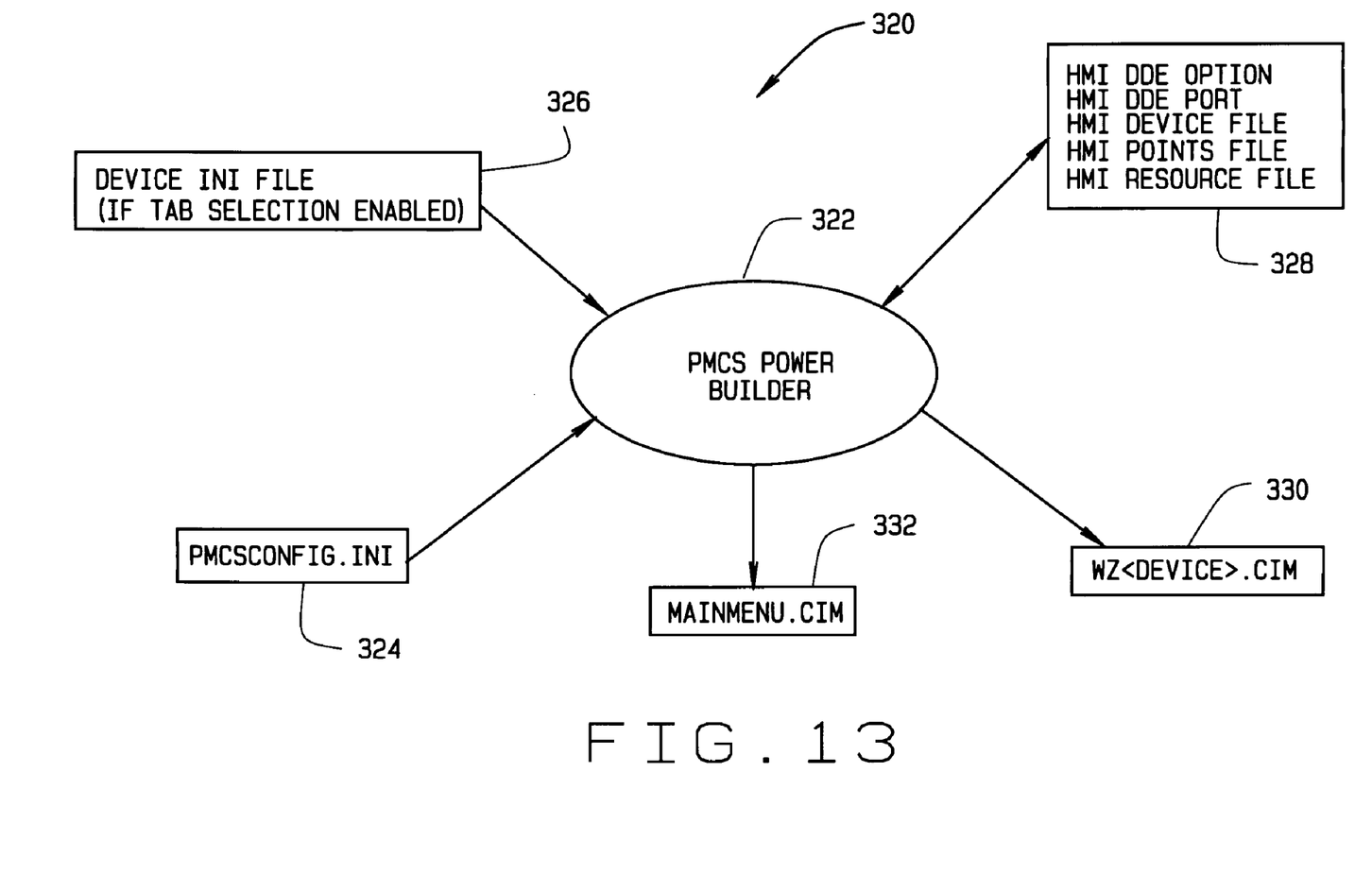
FIG. 13 is a flow diagram illustrating interfaces in PMCS Power Builder.

FIG. 13 is a flow diagram 320 illustrating interfaces in PMCS Power Builder 322. A list of devices that can be configured by PMCS Power Builder 322 is read from a PmcsConfig initialization file 324. PMCS Power Builder 322 also reads from the PmcsConfig initialization file 324 a wizard file for a device to be added which is used in a screen generation. Also read from PmcsConfig initialization file 324 is a small faceplate object name for the device to be added which is further imported into a main menu file.

Also read from PmcsConfig initialization file 324 is a data file containing points to be imported for the device to be added, a tab selection flag that controls whether tab selection is enabled for the device to be added, client flags which define capabilities enabled in the DDE device file, and an event log which defines whether the device type interacts with the PMCS Event Server.

A device initialization file 326 interfaces to PMCS Power Builder for the devices where tab selection has been enabled. A different initialization file is required which contains information regarding the tabs. Each tab has an associated points file, which is imported into the project, if the user selects the particular tab. Information as to which tabs are selected is stored as a bit encoded value in a global point in the project. Such a point is created on a per device basis.

Tab selection capability for a device type is enabled in PmcsConfig initialization file 324. Device initialization file 326 name is also specified in PmcsConfig initialization file 324.

From device initialization file 326, PMCS Power Builder 322 gains access to a file to import which contains point names used across tabs, points on a nameplate of the device wizard screen, a heartbeat diagnostic point and configuration points that contain information on the tabs that are currently selected for the device. Device initialization file 326 also contains information on each configuration point and what each bit of these points specify. Information contained in the bits includes a tab name, a tab screen name and a tab screen view file.

PMCS Power Builder 322 displays available tabs for a device type by reading device initialization file 326. When the user selects a particular tab, PMCS Power Builder 322 imports the points in the tab CSV file. After creating all the required points, PMCS Power Builder 322 sets an initial value for the configuration point in such a way that the bit mask of the point value specifies which tabs are selected. PMCS Power Builder 322 uses the bit mask if the device is modified later.

PMCS Power Builder 322 interacts with HMI configuration files 328 to view configured PMCS devices in a project and to add and/or modify PMCS devices. For example, creation of a DDE port, a DDE device and a fixed set of points configured on the device.

PMCS Power Builder 322 interfaces to wizard device type file. PMCS Power Builder 322 reads PmcsConfig initialization file 324 to determine where a wizard file for the particular device resides, typically in a symbols directory of HMI configuration files 328. PMCS Power Builder 322 then copies the wizard file into the project workspace. If the wizard file already exists in the project workspace, PMCS Power Builder 322 stops the copy of the wizard file for the device and further copies the wizard file for the next device to be configured into the project workspace.

PMCS Power Builder 322 interfaces to a main menu screen to read a small faceplate for each configured PMCS device from a small faceplate file defined in PmcsConfig initialization file 324 and adds it to main menu file 332. PMCS Power Builder 322 then configures the small face plate in advanced mode by configuring the variables on a small face plate object by using an object model.

While the invention has been described in terms of various specific embodiments, those skilled in the art will recognize that the invention can be practiced with modification within the spirit and scope of the claims.

The invention claimed is:

1. A method for adding a plurality of intelligent end devices (IEDs) to a power management control system, said method comprising the steps of:
   prompting a user to create a project;
   prompting the user to add the IEDs to the project;
   executing a file to automatically configure the IEDs;
   generating screens for the IEDs added to the project;

determining, by the power management control system, whether a dynamic data exchange (DDE) protocol is installed within the project;

installing, by the power management control system, the DDE protocol upon determining that the DDE protocol is not installed within the project and upon receiving selection made to add the IEDs to the project;

automatically updating a configuration of at least one of the IEDs and the screens; and restarting, by a computer, the project after at least one of adding, deleting and changing said IEDs.

2. A method according to claim 1 wherein said step of prompting a user to create a new project comprises the step of prompting the user with a Power Builder option.

3. A method according to claim 2 further comprising the step of prompting the user with file selections available for execution, the file selections including a PCMS Power Builder file selection.

4. A method according to claim 1 wherein said step of prompting the user to add the IEDs comprises the step of prompting a user to enter at least one of a device name, a device description, a device type, a resource and an application name for at least one of the IEDs.

5. A method according to claim 1 further comprising the step of prompting a user to enter names and descriptions for the IEDs added to the project.

6. A method according to claim 1 wherein said step of generating screens for the IEDs further comprises the steps of:
creating points associated with the IEDs;
generating a main menu screen which contains pre-configured small faceplate template wizards for the IEDs; and
generating template wizard screens for the IEDs.

7. A method according to claim 1 further comprising automatically determining whether at least one of a communication port, a communication protocol, and a resource name exists within the project.

8. A method according to claim 7 further comprising performing at least one of:
automatically creating the communication port on determining that the communication port does not exist;
automatically creating the communication protocol on determining that the communication protocol does not exist; and
automatically creating the resource name on determining that the resource name does not exist.

9. A method in accordance with claim 1 further comprising:
automatically creating points associated with the IEDs; and
automatically updating a configuration of the points.

10. A power control management system comprising:
a control computer;
at least one intelligent end device interfaced to said control computer for controlling and monitoring power; and
a software package comprising a user interface, an applications layer, an operating system and a Power Builder for facilitating automated addition and configuration of user selected intelligent end devices to said power management control system, said Power Builder configured to build external applications onto a power management control project framework, automatically create points associated with said selected intelligent end devices, generate main menu screens for said selected intelligent end devices, restart a project to which said at least one intelligent end device is added after at least one of adding, deleting and changing said at least one intelligent end device, and install a dynamic data exchange (DDE) protocol within the project upon determining that the DDE protocol is not installed within the project and upon receiving a selection made to add said at least one intelligent end device to the project, wherein said software package is configured to automatically update a configuration of at least one of said selected intelligent end devices, said points, and said screens.

11. A system according to claim 10 wherein said Power Builder configured to facilitate selection of a Power Builder function.

12. A system according to claim 10 wherein said Power Builder configured to facilitate selection of said at least one intelligent end device to add to said power management control system.

13. A system according to claim 12 wherein said Power Builder configured to facilitate entry of device data of at least one of a device name, a device type, a description of at least one of said selected intelligent end devices, a resource for at least one of said selected intelligent end devices, and an application name for at least one of said selected intelligent end devices.

14. A system according to claim 12 wherein said Power Builder configured to:
install an advanced dynamic data exchange (DDE) protocol to the project to which said selected intelligent end devices are added;
create a master DDE port for the project;
create a resource name within the project;
create a DDE device within the project; and
import a set of points from a configuration file associated with at least one of said selected intelligent end devices.

15. A system according to claim 12 wherein said Power Builder configured with a list of configurable devices, a wizard file, a data file with points to be imported for at least one of said selected intelligent end devices to be added, flags and an event log from an initialization file.

16. A system according to claim 15 wherein said Power Builder configured with a device initialization file.

17. A system according to claim 10 wherein said Power Builder configured to facilitate viewing of configured devices using HMI files.

18. A system according to claim 10 wherein said Power Builder configured with a template wizard to generate a small faceplate for at least one of said selected intelligent end devices.

19. A system according to claim 10 wherein said Power Builder configured to update a configuration for the project.

20. A system according to claim 10 wherein said software package is configured to determine whether at least one of a communication port, a communication protocol, and a resource name exist, and said communication port, said communication protocol, and said resource name associated with at least one of said selected intelligent end devices.

21. A system according to claim 20 wherein said software package is configured to perform at least one of:
create said communication port on determining that said communication port does not exist;
create said communication protocol on determining that said communication protocol does not exist; and
create said resource name on determining that said resource name does not exist.

22. A computer programmed to:
prompt a user to create a project;

prompt the user to select a plurality of intelligent end devices (IEDs) to be added to the project;

configure the selected IEDs;

generate screens for the selected IEDs;

determine whether a dynamic data exchange (DDE) protocol is installed within the project;

install the DDE protocol upon determining that the DDE protocol is not installed within the project and upon receiving a selection made to add the selected IEDs to the project;

automatically update a configuration of at least one of the selected IEDs and the screens; and restart the project after at least one of adding, deleting and changing the selected IEDs.

23. A computer according to claim 22 wherein to prompt a user to create a project, said computer displays a computer generated screen with a selectable Power Builder function.

24. A computer according to claim 22 wherein to configure the selected IEDs, said computer displays at least one computer generated screen prompting a user to enter at least one of a device name, a device type, a description of at least one of the selected IEDs, a resource for at least one of the selected IEDs, and an application name for at least one of the selected IEDs.

25. A computer according to claim 22 wherein to generate screens for the selected IEDs, said computer displays a computer generated screen prompting a user to generate the screens.

26. A computer according to claim 22, said computer programmed to determine whether at least one of a communication port, a communication protocol, and a resource name exists within the project.

27. A computer according to claim 26, said computer programmed to perform at least one of:

create said communication port on determining that said communication port does not exist;

create said communication protocol on determining that said communication protocol does not exist; and create said resource name on determining that said resource name does not exist.

28. A method for facilitating automated addition and configuration of user selected intelligent end devices (IEDs) to a power management control system, said method comprising the steps of:

building an external application onto a project framework, wherein said building comprises:

automatically configuring components associated with IEDs;

generating main menu screens for the IEDs; and automatically updating a configuration of at least one of the components and the IEDs;

restarting, by a computer, a project to which the IEDs are added after at least one of adding, deleting and changing the IEDs; and installing, by the power management control system, a dynamic data exchange (DDE) protocol within the project upon determining that the DDE protocol is not installed within the project and upon receiving a selection made to add the IEDs to the project.

29. A method according to claim 28 wherein said step of building an external application onto a project framework further comprises the step of selecting a Power Builder function.

30. A method according to claim 28 further comprising:

automatically creating points associated with the IEDs; and selecting the IEDs to add to a project.

31. A method according to claim 30 wherein said step of selecting the IEDs to add to the project further comprises the step of entering device data of at least one of a device name, a device type, a description of at least one of the IEDs, a resource for at least one of the IEDs, and an application name for at least one of the IEDs.

32. A method according to claim 30 further comprising the steps of:

installing an advanced dynamic data exchange (DDE) protocol to the project;

creating a master DDE port for the project;

creating a resource name within the project;

creating a DDE device within the project; and importing a set of points from a configuration file associated with the DDE device.

33. A method according to claim 30 wherein said step of selecting the IEDs to add to the project further comprises the step of reading a list of configurable devices, a wizard file, a data file with points to be imported for at least one of the IEDs to be added, flags and an event log from an initialization file.

34. A method according to claim 33 further comprising the step of reading a device initialization file.

35. A method according to claim 33 further comprising the step of viewing configured devices using HMI files.

36. A method according to claim 28 wherein said step of generating main menu screens further comprises the step of using a template wizard to generate a small faceplate for at least one of the IEDs.

37. A method according to claim 28 further comprising determining whether at least one of a communication port, a communication protocol, and a resource name exists, wherein the communication port, communication protocol, and resource name are associated with at least one of the IEDs.

38. A method according to claim 37 further comprising performing at least one of:

automatically creating the communication port on determining that the communication port does not exist;

automatically creating the communication protocol on determining that the communication protocol does not exist; and automatically creating the resource name on determining that the resource name does not exist.

* * * * *